Aug. 19, 1958 G. A. LYON 2,848,277
WHEEL COVER
Filed Feb. 18, 1954
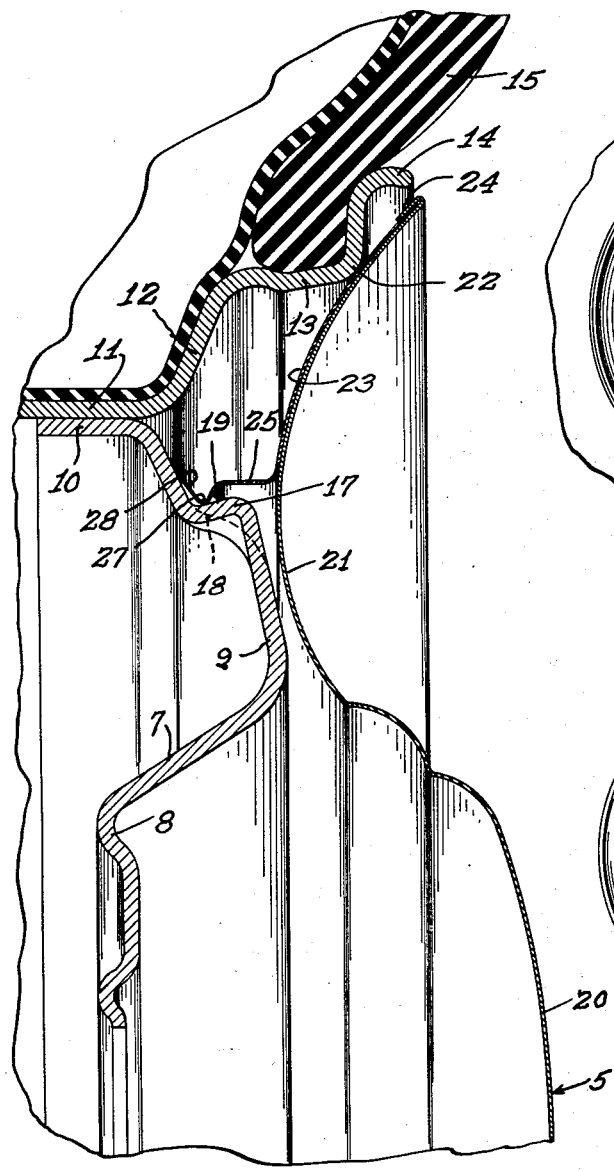
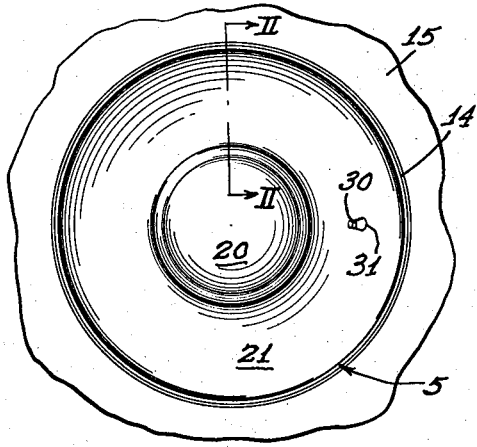
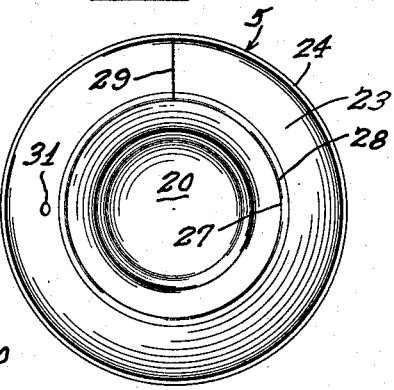
Inventor
GEORGE ALBERT LYON

2,848,277

WHEEL COVER

George Albert Lyon, Detroit, Mich.

Application February 18, 1954, Serial No. 411,151

5 Claims. (Cl. 301—37)

The present invention relates to improvements in wheel structures and more particularly concerns the ornamental and protective covering of the outer sides of the wheels.

An important object of the present invention is to provide an improved wheel structure having at the outer side thereof a novel cover adapted for snap-on pry-off attachment.

Another object of the invention is to provide a novel two-piece cover construction.

A further object of the invention is to provide in a wheel structure provided with retainer bumps on the body thereof an improved cover for snap-on retaining engagement with the cover-retaining bumps.

Still another object of the invention is to provide a novel cover comprising drawn and rolled components.

Other objects, features and advantages of the present invention will be readily apparent from the following detailed description of a preferred embodiment thereof taken in conjunction with the accompanying drawing, in which:

Figure 1 is a side elevational view of a wheel structure embodying features of the invention;

Figure 2 is an enlarged fragmentary radial sectional view taken substantially on the line II—II of Figure 1; and Figure 3 is a rear elevational view of the cover.

A wheel cover 5, according to the present invention, is constructed and arranged to be applied to the outer side of a wheel of the kind covered in my Patent 2,445,330, issued July 20, 1948. Such a wheel comprises a wheel body 7 having a central dished bolt-on flange 8 about which is disposed a generally axially outwardly extending annular nose bulge 9 which at its radially outer side merges with a generally axially inwardly directed attachment flange 10 by which the wheel body is attached to a base flange 11 of a tire rim. The tire rim is of the multi-flanged drop center type including a side flange 12 merging with an intermediate flange 13 which in turn merges with a generally radially outwardly and axially outwardly turned terminal flange 14. The tire rim is adapted to support a pneumatic tire and tube assembly 15.

For retaining a cover on the outer side of the wheel, the wheel body 7, and more particularly the nose bulge 9 thereof is provided with a series of retaining bumps 17 which extend generally radially outwardly from the radially outer side of the nose bulge 9 provided with a generally radially outwardly facing annular shoulder 18 beyond which generally axially inwardly and radially outwardly facing shoulders 19 on the cover-retaining bumps project a predetermined distance. There may be three to five of the cover-retaining bumps 17 disposed with the retaining shoulders 19 thereof in a common circle of slightly larger diameter than the maximum diameter of the shoulder 18.

The cover 5 is preferably of the full disk type adapted to substantially entirely cover the outer side of the wheel including the wheel body 7 and the tire rim. To this end the cover 5 comprises a sheet metal, such as stainless steel or brass, plate stamped or drawn to form and including a crown portion 20 adapted to overlie the wheel body and more particularly the bolt-on flange portion 8 thereof. The crown portion 20 slopes at its sides toward and merges into a deeply and widely dished annular outer cover portion 21 which is of a concave dimension to fit generally into the space between the tire rim and the nose bulge 9 and at its radially inner side overlies the nose bulge 9, while at its radially outer extremity the outer cover portion overlies the terminal flange 14 of the tire rim. By preference the radially outer portion of the cover bears toward a shoulder 22 provided at juncture of the intermediate flange 13 with the terminal flange 14 of the tire rim. The cover disk may be polished and plated or otherwise appropriately finished to provide a desired ornamental appearance for the wheel. According to the present invention, the outer cover plate comprising the integral crown and outer portions 20 and 21 may be made from a fairly thin sheet material. For retaining the cover on the wheel means are provided which not only reinforce the outer marginal portion of the cover but also provide for retaining engagement with the cover-retaining bumps 17. To this end, the radially outer marginal portion of the dished cover section 21 is disposed in internested relation with a reinforcing and backing ring 23 fitting snugly against the back of the cover and having its radially outer margin engaged clampingly by an underturned extremity flange 24 on the cover plate providing a reinforcing and finishing edge on the plate which in assembly with the wheel is preferably spaced from the tip of the terminal flange 14 to afford a gap for accommodating wheel balancing weights and also to facilitate introduction of a pry-off tool behind the cover.

At its inner margin the backing and cover attachment ring 23 is provided with a generally axially inwardly directed flange 25 of slightly larger diameter than the maximum diameter of the retaining bumps 17 and adapted in assembly with the wheel to lie concentrically about the retaining bumps.

For engagement in snap-on pry-off relation with the retaining bumps, the flange 25 is provided at its inner end portion with an annular radially inwardly directed bump-engaging rib 27 which is of a slightly smaller diameter than the minimum diameter to which the retaining shoulders 19 of the retaining bumps extend. Extending generally radially outwardly and axially inwardly at the axially inner side of the rib 27 is a cam flange 28 adapted to engage the noses of the retaining bumps 17 when the cover is pressed axially inwardly to cam the rib 27 into resiliently deflected relation radially outwardly for snapping over the retaining bumps. The axially inward extent of the flange 25 including the cam flange terminal portion 28 thereof is preferably such that when the retaining rib 27 has engaged fully with the retaining bumps and the resilient action of the rib 27 against the cam-like shoulders 19 has caused the cover to be drawn axially inwardly to its maximum extent, the radially outer portion of the cover will be drawn against the tire rim shoulder 22 in snug rattle-free relation.

By preference the cover reinforcing and retaining ring 23 is made as a rolled ring from straight strip stock which may be sheet metal of suitable grade and gauge but not necessarily of as high a grade as the cover plate. The rolled ring has the adjacent ends thereof in at least close adjacency providing a joint 29 as seen in Fig. 3 which may be secured by welding or may be left unsecured so as to afford easier resilient deflectability of the resilient cover-retaining flange 25.

For accommodating a valve stem 30 (Fig. 1) the superimposed cover plate and cover reinforcing and retaining ring 23 are provided with matching apertures 31.

In applying the cover to the wheel it is generally centered with respect to the outer side of the wheel and properly located so that the valve stem 30 projects through the registering opening 31 and the cover is then pressed axially inwardly to snap the retaining rib 27 of the flexible retaining flange 25 over the retaining bumps 17. This causes the rib 27 to be stretched radially outwardly at the places where it engages the retaining shoulders 19, and the intermediate portions of the retaining rib 27 between the retaining bumps will be drawn radially inwardly into engagement with the wheel body shoulder 18 substantially in the manner described in my aforesaid patent.

For removing the cover a pry-off tool such as a screwdriver or the like may be applied behind the outer margin of the laminated cover structure and pry-off pressure exerted for forcing the retaining rib 27 out of engagement with the retaining bumps 17. During such application of pry-off force, the inner protective ring 23 protects the cover plate against pry-off tool denting and damage.

Inasmuch as the cover plate portion 21 is of a large radius curvature to its edge extremity, and the reinforcing plate 23 is of complementary curvature, a fair amount of resilient flexing of the laminated cover margin where it engages the tire rim is permitted so that weaving of the tire rim as may occur when the wheel in service moves around corners or curves with the associated vehicle will be accommodated without forcing the cover from the engaged relation with the bumps 17.

It will be understood that modifications and variations may be effected without departing from the scope of the novel concepts of the present invention.

I claim as my invention:

1. In a wheel structure including a tire rim and wheel body having generally radially outwardly directed cover retaining bumps thereon, a cover for disposition at the outer side of the wheel comprising a plate adapted to overlie the wheel body and having an outer extremity to substantially cover the tire rim, said plate having a flange extending in reinforcing relation from the outer extremity thereof inwardly and provided with a terminal flange portion extending generally axially inwardly and having a radially inwardly projecting bump-engaging inner terminal structure thereon engageable in snap-on pry-off relation with the bumps.

2. In a wheel structure including a tire rim and a wheel body having an annular nose bulge thereon provided at the radially outer side thereof with a series of radially outwardly projecting retaining bumps, a cover for disposition at the outer side of the wheel comprising a cover plate dimensioned to substantially overlie the tire rim and having therebehind a reinforcing and retaining flange underlying the radially outer margin of the cover plate and overlying the tire rim and having at its radially inner margin a generally axially inwardly directed retaining flange of larger diameter than the retaining bumps and having a radially inwardly directed bump-engaging rib of a slightly smaller diameter than the minimum diameter described by the bumps and engageable in resilient snap-on pry-off relation with the bumps to retain the cover on the wheel.

3. In a wheel structure including a tire rim and a wheel body having an annular nose bulge thereon provided at the radially outer side thereof with a series of radially outwardly projecting retaining bumps, a cover for disposition at the outer side of the wheel comprising a cover plate dimensioned to substantially overlie the tire rim and having therebehind a reinforcing and retaining ring underlying the radially outer margin of the cover plate and having at its radially inner margin a generally axially inwardly directed retaining flange of larger diameter than the retaining bumps and having a radially inwardly directed bump-engaging rib of a slightly smaller diameter than the minimum diameter described by the bumps and engageable in resilient snap-on pry-off relation with the bumps to retain the cover on the wheel, the radially outer portion of the cover plate and ring assembly being drawn by engagement of said rib with the bumps against the tire rim.

4. In a wheel structure including a tire rim and a wheel body having generally radially outwardly directed cover retaining bumps thereon, a cover for disposition at the outer side of the wheel comprising a plate adapted to overlie the wheel body and having an outer extremity to substantially cover the tire rim, said plate having a flange extending in reinforcing relation from the outer extremity thereof inwardly and provided with a terminal flange portion extending generally axially inwardly and having a radially inwardly projecting bump-engaging inner terminal structure thereon engageable in snap-on pry-off relation with the bumps, said flange comprising a separate annular member secured to the plate by an under turned radially outer extremity flange portion of the plate.

5. In a wheel structure including a tire rim and a wheel body having generally radially outwardly directed cover retaining bumps thereon, a cover for disposition at the outer side of the wheel comprising a plate adapted to overlie the wheel body and having an outer extremity to substantially cover the tire rim, said plate having a flange extending in reinforcing relation from the outer extremity thereof inwardly and provided with a terminal flange portion extending generally axially inwardly and having a radially inwardly projecting bump-engaging inner terminal structure thereon engageable in snap-on pry-off relation with the bumps, said plate and flange being of annularly dished form and internested and drawn against the tire rim by said engagement of the terminal structure and bumps.

References Cited in the file of this patent

UNITED STATES PATENTS

| | | |
|---|---|---|
| 2,098,205 | Eksergian | Nov. 2, 1937 |
| 2,133,597 | Tjaarda | Oct. 18, 1938 |
| 2,329,921 | Lyon | Sept. 21, 1943 |
| 2,368,229 | Lyon | Jan. 30, 1945 |
| 2,444,053 | Lyon | June 29, 1948 |
| 2,445,330 | Lyon | July 20, 1948 |
| 2,551,327 | Horn | May 1, 1951 |
| 2,569,483 | Lyon | Oct. 2, 1951 |

FOREIGN PATENTS

| | | |
|---|---|---|
| 771,880 | France | Aug. 6, 1934 |
| 782,207 | France | Mar. 11, 1935 |
| 948,322 | France | July 28, 1949 |
| 997,116 | France | Jan. 2, 1952 |